Sept. 15, 1964   W. L. ZEMBERRY   3,149,193
APPARATUS FOR REMOVING SURFACE DEFECTS
Filed Nov. 12, 1957   8 Sheets-Sheet 1

INVENTOR
WILLIAM L. ZEMBERRY
By: Donald G. Dalton
Attorney

Sept. 15, 1964     W. L. ZEMBERRY     3,149,193
APPARATUS FOR REMOVING SURFACE DEFECTS
Filed Nov. 12, 1957     8 Sheets-Sheet 6

INVENTOR
WILLIAM L. ZEMBERRY
By: Donald G. Dalton
Attorney

Sept. 15, 1964 W. L. ZEMBERRY 3,149,193
APPARATUS FOR REMOVING SURFACE DEFECTS
Filed Nov. 12, 1957 8 Sheets-Sheet 7

INVENTOR
WILLIAM L. ZEMBERRY
By: Donald G. Dalton
Attorney

Sept. 15, 1964 W. L. ZEMBERRY 3,149,193
APPARATUS FOR REMOVING SURFACE DEFECTS
Filed Nov. 12, 1957 8 Sheets-Sheet 8

FIG. 11

INVENTOR
WILLIAM L. ZEMBERRY
BY: Donald G. Dalton
Attorney

United States Patent Office 3,149,193
Patented Sept. 15, 1964

3,149,193
APPARATUS FOR REMOVING SURFACE DEFECTS
William L. Zemberry, Pittsburgh, Pa., assignor to United
States Steel Corporation, a corporation of New Jersey
Filed Nov. 12, 1957, Ser. No. 695,700
5 Claims. (Cl. 266—23)

This invention relates to an improved method and apparatus for removing surface defects from semi-finished steel shapes, such as billets, blooms, or slabs.

For convenience I refer hereinafter to semi-finished steel shapes to which my invention applies as "billets," but I do not intend this term to limit the invention. Commonly defective portions of a billet surface are burned away with an oxygen torch, a procedure known as "scarfing," before the billet is rolled to a finished shape. Except for continuous scarfing operations where an entire surface is burned away, scarfing is largely a manual operation in which operators locate individual defects and apply the torches by hand. Nevertheless methods are known for detecting defects more accurately than by visual observation alone. For example, eddy currents can be induced in a billet surface and differences in conductivity caused by defects can be measured, or a luminescent or magnetic material can be coated on the surface and differences in the coating pattern caused by defects can be observed.

An object of the present invention is to provide an improved scarfing method and apparatus which is largely automatic, that is, in which defects in a billet surface are detected by one of the known procedures and recorded, and the recording subsequently automatically operates scarfing torches for burning out the defects.

A further object is to provide a continuous scarfing method and apparatus in which a billet surface is inspected automatically for defects at one station, and the billet advances to another station where these defects are automatically burned out with scarfing torches operated from a recording made at the first station.

A further object is to provide a scarfing method and apparatus in which a magnetic recording of defects in a billet surface turns scarfing torches on and off automatically as they traverse the surface.

A more specific object is to provide an improved scarfing method and apparatus in which a billet surface is scanned for defects at one station while a magnetic recording is made of the defects, and the billet advances to a second station where scarfing torches traverse its surface and are turned on and off by a transcriber moving over the recording.

In accomplishing these and other objects of the invention, I have provided improved details of structure, a preferred form of which is shown in the accompanying drawings, in which:

FIGURE 8 is a top plan view on a larger scale than FIGURE 1 of the scarfing device;

Figure 1:
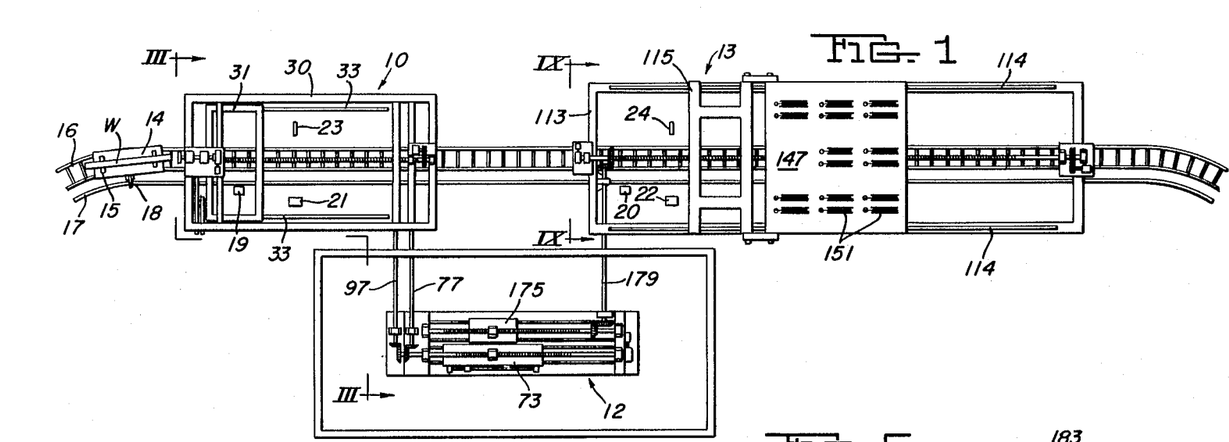
FIGURE 1 is a diagrammatic top plan view of a detecting and scarfing apparatus constructed in accordance with my invention.

As shown in FIGURE 1, my apparatus includes essentially a detecting device 10, a recorder-transcriber 12 and a scarfing device 13. The detecting and scarfing devices are horizontally aligned but spaced apart end to end. The recorder-transcriber is offset from these devices and located opposite the space between them, preferably in a separate control room. A billet W, illustrated as circular in cross section, is loaded on a car 14 ahead of the entry end of the detecting device 10. The cars have notched work supports 15 adapted to support billets in a position where they are centered over the longitudinal axis of the car. The cars travel on a track 16 and each moves first into the detecting device, where it stops while surface defects on the upper half of the billet are detected and simultaneously recorded on the recorder-transcriber 12. Thereafter the car advances along the track into the scarfing device 13, where it stops while the recorder-transcriber controls scarfing torches to burn out the defects. The car then continues along the track, which preferably forms a closed loop, and the billet is inverted and the foregoing steps repeated on the other half by use of duplicate apparatus not shown. While one billet is being processed in the scarfing device, a second billet can be processed in the detecting device. A sufficient number of cars 14 are provided to allow simultaneous processing of two billets in the apparatus illustrated, two more in the duplicate apparatus, and to allow loading, turning and unloading of other billets while the four are being processed.

The preferred drive for cars 14 includes a continuously driven conveyor chain 17 mounted alongside track 16 and propelling arms 18 pivoted to the respective cars. When one of the arms 18 is lowered, it engages the chain so that the car moves therewith; when the arm is raised, it clears the chain and the car stops. Pneumatically operated kickouts 19 and 20 are located adjacent chain 17 within the detecting and scarfing devices 10 and 13 respectively. When a car carries a billet to the proper position within either device, the kickout operates automatically to raise the propelling arm 18 and stop the car. A preferred means for actuating each kickout includes photocells 21 and 22 and cooperating light sources 23 and 24 within the detecting and scarfing devices respectively. When the leading end of a billet passes between either photocell and its light source, the resulting darkening of the photocell actuates a circuit which admits compressed air to the kickout to raise the propelling arm. When the detecting or scarfing device completes its operation, the kickout is reset by manual actuation to advance the car. The circuit for actuating and resetting the kickout can follow well known principles, and in the interest of simplicity is not illustrated. It is also apparent that equivalent results can be attained with numerous other forms of drive or other forms of stop means for the drive illustrated.

*Detecting Device*

Figure 2:
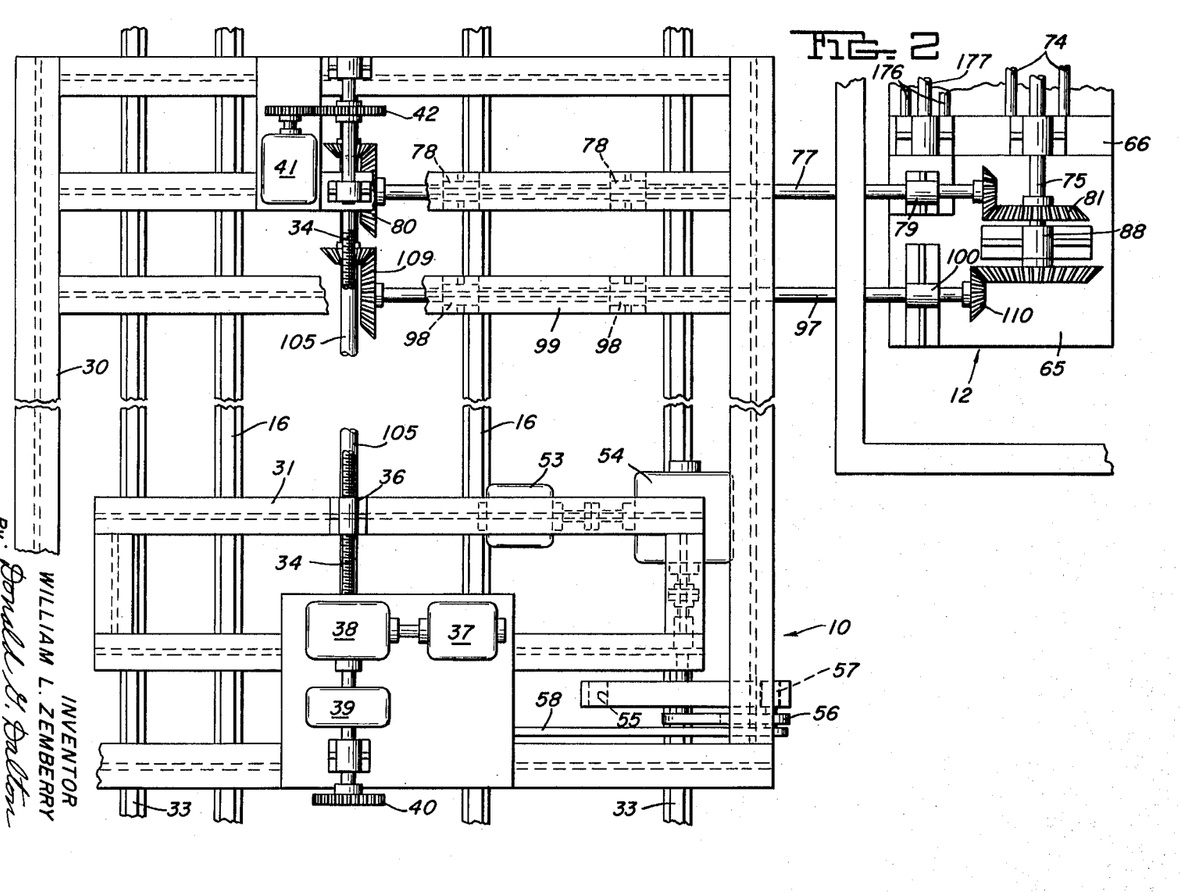
FIGURE 2 is a top plan view on a larger scale and with parts broken away of the detecting device and a portion of the recorder-transcriber embodied in my apparatus.
Figure 3:
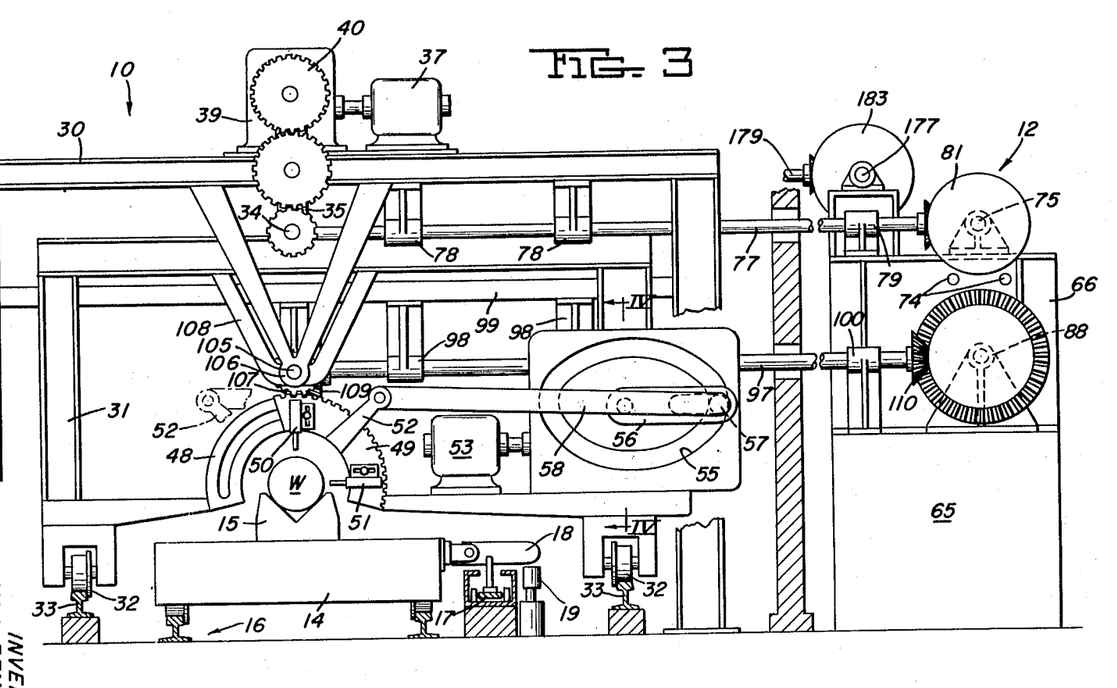
FIGURE 3 is a vertical section of the detecting device and recorded-transcriber taken on line III—III of FIGURE 1, the scale being similar to FIGURE 2.

As shown in FIGURES 2 and 3, the detecting device 10 comprises a fixed frame 30 and a longitudinally movable carriage 31, both of which straddle the car 14 and billet W carried thereby. Carriage 31 has flanged wheels 32 which ride on rails 33 located outside the track 16 on opposite sides thereof. A lead screw 34 for driving the carriage is journaled in bearing brackets 35, which depend from the underside of the top members of the frame, and threadedly engages a feed nut 36 fixed on the carriage top. A drive motor 37 is mounted on top of the frame adjacent the entry end and is connected to the lead screw through a speed reducer 38, magnetic clutch 39 and gearing 40. A quick-return drive motor 41 is mounted on the frame adjacent the exit end and is connected to the lead screw through gearing 42.

Figure 4:
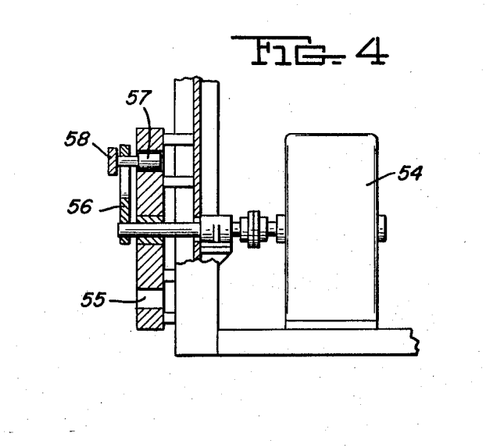
FIGURE 4 is a vertical section on line IV—IV of FIGURE 3, the parts being shown in a different position to clarify the showing.

The detecting device illustrated is for use with billets of circular cross section. In this instance a semicircular guide 48 is fixed to carriage 31 in a position to overlie a round billet W carried by the work supports 15. A quadrant-shaped gear segment 49 is supported on guide 48 to swing through a 90° arc about the billet axis as a center. A pair of detectors 50 and 51 are fixed to opposite ends of the gear segment 49 spaced 90° apart, but are adjustable radially of the billet to accommodate billets of different sizes. A drive arm 52 is fixed to the midportion of the gear segment and is connected to a constant speed oscillating drive. As shown in FIGURES 3 and 4, this drive includes a motor 53, speed reducer 54 and cam track 55 mounted on the carriage. The motor drives a crank 56. A cam follower 57 is confined for radial movement in crank 56 and is guided in such movement by the cam track 55. A connecting rod 58 is pivoted to the cam follower 57 and to the drive arm 52. It is seen that rotation of crank 56 oscillates the gear segment 49 and detectors 50 and 51 back and forth through a 90° arc.

The detectors themselves can be of any appropriate type for generating electric signals when they pass over a defect in the billet. For example the billet can be coated beforehand with luminescent or magnetic material which forms a surface pattern in response to defects, and the detectors can be light-sensitive cells. Suitable procedures for detecting flaws in this manner are disclosed in De Forest Reissue Patent No. 19,611 and Switzer Patent No. 2,250,400. Another possibility involves measurement of eddy currents in the billet, for example with a detector like that shown in Harmon et al. Patent No. 2,660,704. Since the detectors per se are known and not of my invention, no more detailed showing is deemed necessary.

After the car 14 stops in the detecting device with the billet properly positioned, clutch 39 is engaged, and motor 37 drives the lead screw 34 to advance the carriage 31 slowly longitudinally of the billet. At the same time the gear segment commences to oscillate 90° around the upper half of the billet. These movements can be initiated by actuation of manually controlled switches or automatically by actuation of suitable limit switches, not shown. The relative speeds are such that the carriage advances a distance approximately equal to the width of one of the detectors each time the gear segment turns 90°. In this manner detector 50 traverses the entire surface of the upper left quadrant of the billet in a series of spiral paths, and detector 51 similarly traverses the entire surface of the upper right quadrant. After the detectors have completed their traverse of the upper half of the billet, the clutch is disengaged, the oscillating drive stopped, and the quick-return drive motor 41 operated to return the carriage more rapidly, these operations likewise being controlled either manually or automatically through suitable limit switches. Since the device illustrated stops billets with their leading ends always in the same position, the carriage preferably travels from the leading end of the billet toward the trailing end in its detecting pass and in the opposite direction to return. The kickout 19 next is lowered to lower the propelling arm 18 and thus allow the chain 17 to propel the car 14 and billet from the detecting device into the scarfing device. Another car and billet can be positioned in the detecting device as soon as the first car and billet leave.

*Recorder*

Figure 5:
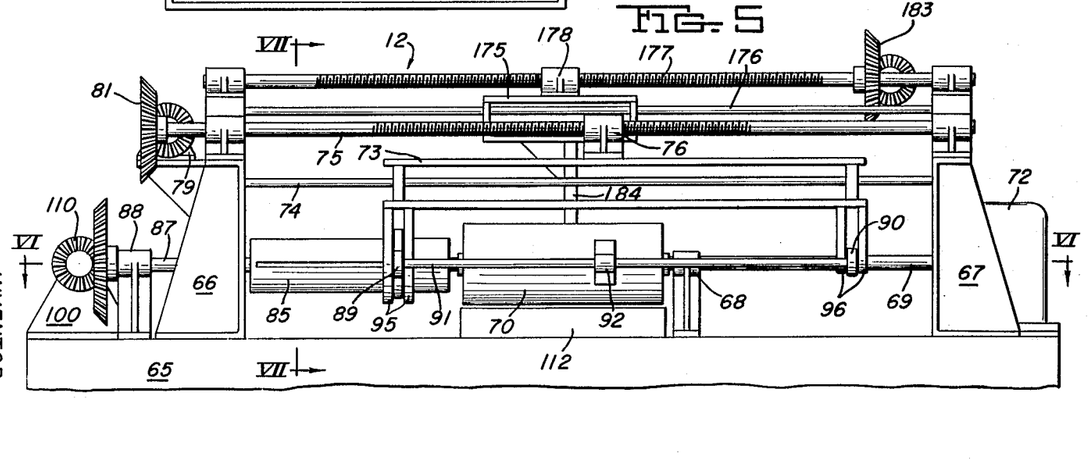
FIGURE 5 is a side elevational view of the recorder-transcriber.
Figure 6:
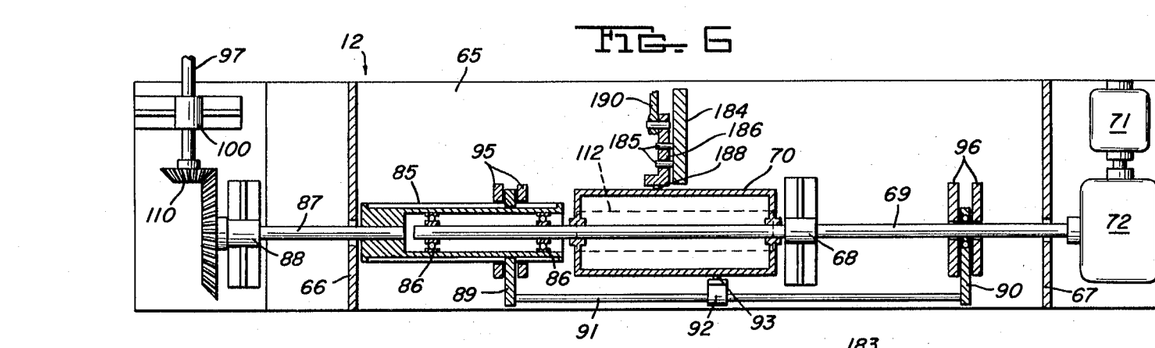
FIGURE 6 is a horizontal section on line VI—VI of FIGURE 5.
Figure 7:
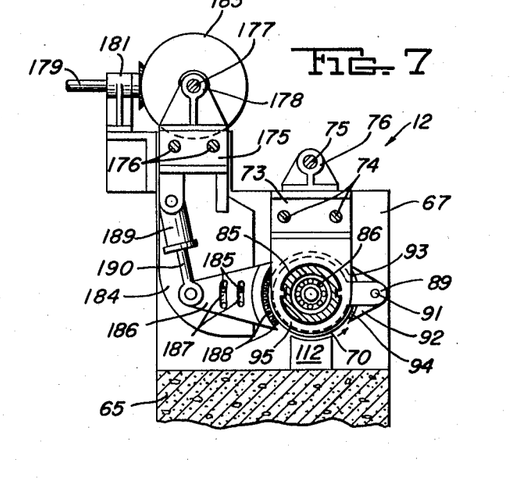
FIGURE 7 is a vertical section on line VII—VII of FIGURE 5.

As shown in FIGURES 5, 6 and 7, the recorder-transcriber 12 has a stationary frame 65 which carries upstanding end plates 66 and 67 and an intermediate bearing block 68. A horizontal shaft 69 is journaled in the bearing block 68 and carries a magnetic recording cylinder 70 which occupies approximately the middle third of its length. A drive motor 71 and speed reducer 72 are mounted on frame 65 outside the end plate 67 and are connected to shaft 69 to rotate the cylinder in half-revolution steps. A yoke 73 is slidably mounted on fixed guide rods 74 which extend between the end plates 66 and 67 above the cylinder. A lead screw 75 is journaled in bearings on the respective end plates and threadedly engages a feed nut 76 fixed to the top of the yoke. A transverse recorder drive shaft 77 is journaled in bearings 78, which are located on the underside of the top member of frame 30 of the detecting device 10 (FIGURE 3) and in a bearing 79 which is located on the end plate 66. Shaft 77 is connected to the lead screw 34 through bevel gears 80 (FIGURE 2) and to the lead screw 75 through bevel gears 81. Consequently whenever the lead screw 34 is driven to move the carriage 31, the lead screw 75 also is driven to move the yoke 73 in the same direction along its guide rods 74. Preferably movement of the yoke is scaled down, and with the gearing illustrated is one-fourth that of the carriage.

Shaft 69 has a free end extending into a sleeve 85 which is rotatable relative to the shaft on internal bearings 86 (FIGURE 6). A shaft 87 coaxial with shaft 69 is fixed to sleeve 85 and journaled in a bearing 88 on frame 65. A radially extending rocker arm 89 has a spline connection with sleeve 85, whereby the arm is slidable along the sleeve, but rotation of the sleeve swings the arm around the axis of shafts 69 and 87. A second radially extending rocker arm 90 is slidably and pivotally supported on shaft 69. A rod 91 is connected at its ends to the respective rocker arms and carries an arcuate bracket 92 which overlies a portion of the cylinder 70 and to which two arcuately spaced recording heads 93 and 94 are attached in proximity to the cylinder. The yoke 73 has a pair of depending ears 95 on opposite sides of the rocker arm 89 and a second pair of depending ears 96 on opposite sides of rocker arm 90. As the yoke travels along its guide rods 74, the ears push the rocker arms in the same direction and thus move the recording heads longitudinally of the cylinder. A transverse oscillating drive shaft 97 is journaled in bearings 98 which are fixed to a transverse member 99 forming part of frame 30 of the detecting device 10 (FIGURE 3), and a bearing 100 fixed to frame 65. A longitudinal oscillating shaft 105 is journaled in bearings 106 which depend from the top of frame 30. Shaft 105 carries a pinion 107 which is slidably keyed thereto and meshes the gear segment 49. Carriage 31 has a depending yoke 108 which pushes pinion 107 along shaft 105 as the carriage moves. Shaft 105 has a pinion and gear connection 109 with one end of the transverse shaft 97. The other end of shaft 97 has a pinion and gear connection 110 with shaft 87. This mechanism transmits oscillating motion of the gear segment 49 to the rocker arms 89 and 90 and hence to the recording heads 93 and 94, although preferably on a reduced scale. The gearing illustrated oscillates the recording heads through half the arc the gear segment oscillates.

Detectors 50 and 51 are electrically connected to the recording heads 93 and 94 respectively through suitable conventional amplifiers. The spacing between the two recording heads is in the same ratio to the spacing between the two detectors as the respective arcs of oscillatory movement. In the present illustration, the spacing of the recording heads is half that of the detectors or 45°. The recording heads move over the magnetic cylinder 70 in spiral paths similar to the paths of the detectors, but on a reduced scale, 4 to 1 longitudinally and 2 to 1 circumferentially in the present illustration. When ever a defect in the billet induces a signal in one of the detectors, the corresponding recording head magnetizes a spot on the cylinder. After the detectors have completed their traverse of the billet, motor 71 operates either by manual actuation or automatically through suitable limit switches to turn the cylinder a half revolution counter-clockwise and place the resulting recording of defects in the billet in a position to cooperate with the transcribing mechanism, hereinafter described. A magnet eraser 112 is mounted on the frame 65 to clear the cylinder of previous recording as a new portion of its surface moves to a position opposite the recording heads.

*Scarfing Device*

Figure 9:
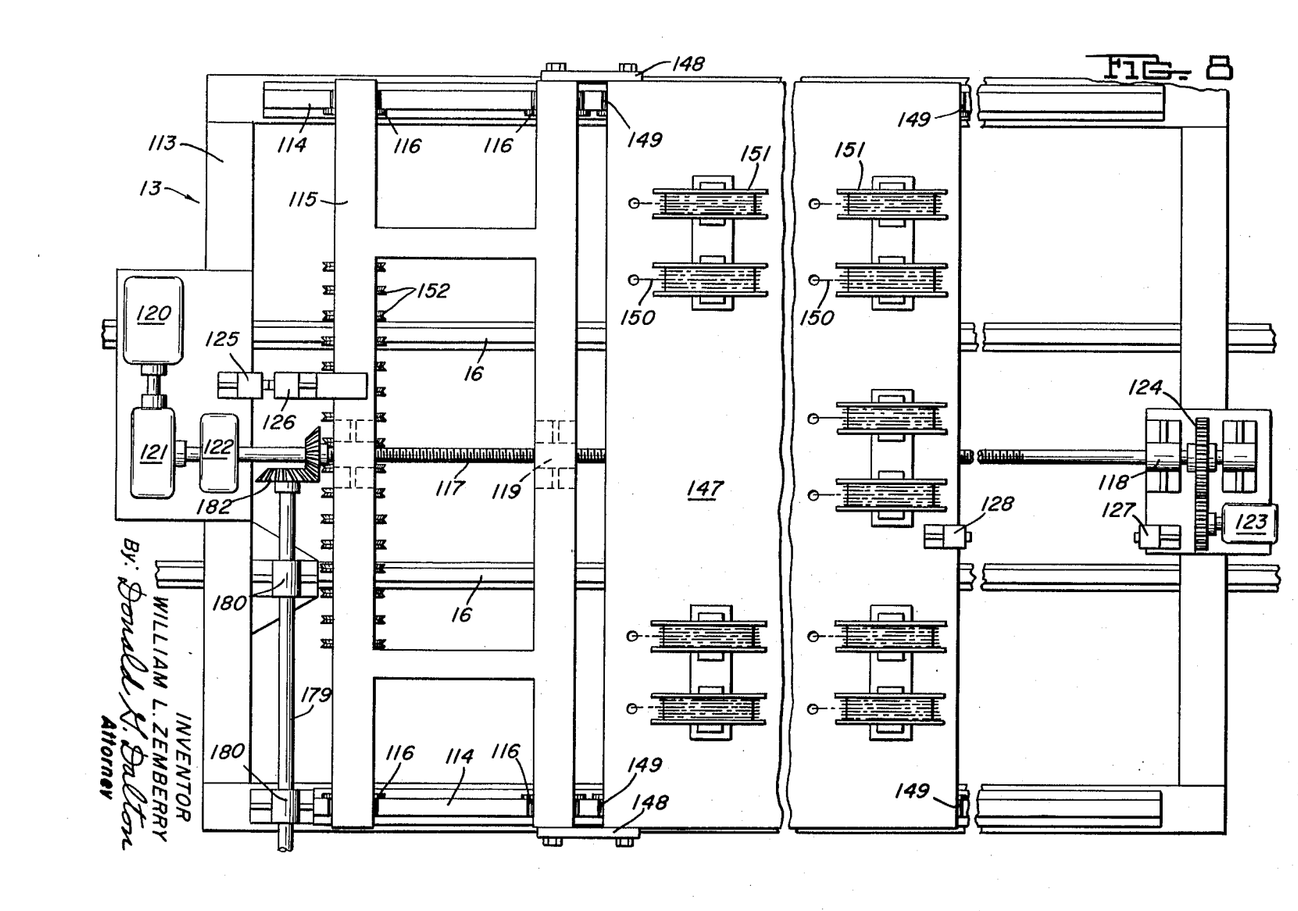
FIGURE 9 is an end elevational view of the scarfing device taken on line IX—IX of FIGURE 1.
Figure 10:
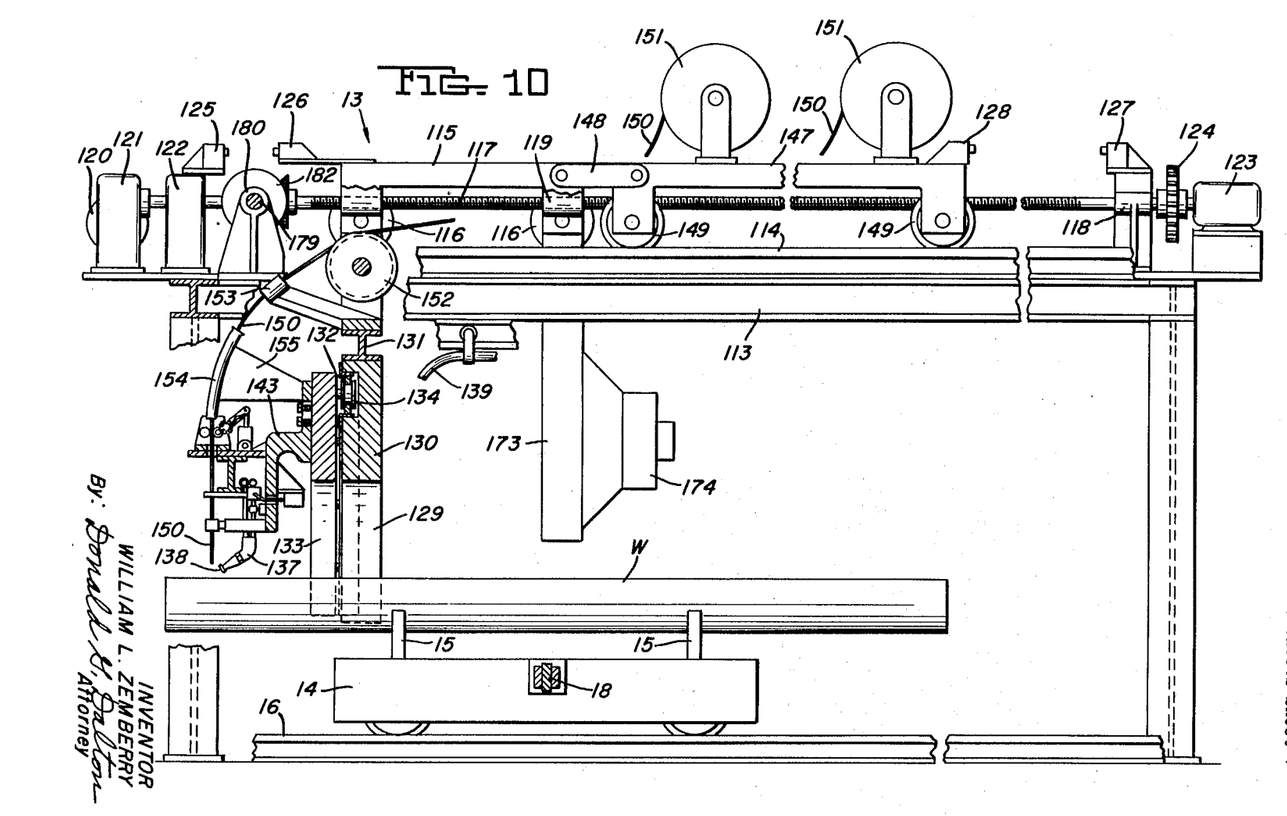
FIGURE 10 is a vertical section on line X—X of FIGURE 9.

As shown in FIGURES 8, 9 and 10, the scarfing device 13 includes a fixed frame 113 which straddles car 14 and track 16 and has longitudinal rails 114 mounted along its upper edges. A scarfing carriage 115 is supported on frame 113 and has flanged wheels 116 which ride on rails 114 to enable the carriage to travel longitudinally of a billet W on the car. A lead screw 117 is journaled in bearings 118 on the top of frame 113 and threadedly engages a feed nut 119 on the carriage. The lead screw is driven at a relatively slow rate to propel the carriage for scarfing the billet through a drive motor 120, speed reducer 121 and magnetic clutch 122 mounted on frame 113 adjacent the entry end. The lead screw is driven at a more rapid rate to return the carriage through a quick-return drive motor 123 and gearing 124 mounted on frame 113 adjacent the exit end. Preferably a limit switch 125 is mounted on frame 113 adjacent the entry end and an actuator 126 for this switch on carriage 115 (FIGURE 10). At the conclusion of each scarfing pass, the actuator engages the switch to initiate return movement. Likewise a limit switch 127 is mounted on frame 113 adjacent the exit end and an actuator 128 therefor on carriage 115 to stop return movement. Since the circuits which control carriage movement involve conventional principles, no showing is deemed necessary. If desired, limit switches also can be used to start each scarfing pass and to control indexing of the torches. Since the mechanism illustrated stops billets with their leading ends always in the same position, the carriage travels from the leading end of the billet toward the trailing end as it makes its scarfing pass and in the opposite direction as it returns.

A pair of vertical members 129 depend from opposite sides of carriage 115 adjacent the entry end within frame 113. A fixed vertical plate 130 having an arcuate cutout in its lower edge and a horizontal beam 131 extend between these vertical members. Plate 130 carries an arcuate, substantially semicircular trackway 132 whose center coincides with the longitudinal axis of a billet W positioned within the scarfing device. An indexing plate 133 is supported on said trackway, having rollers 134 journaled to its rear face riding on the trackway. Thus the indexing plate can swing about the billet axis between a first position illustrated in FIGURE 9 and a second position a few degrees counterclockwise therefrom. A double-acting fluid pressure cylinder 135, equipped with suitable control valves, not shown, is supported on one of the vertical members 129 and contains a reciprocable piston and piston rod 136 which is connected to the indexing plate for swinging it between these positions. This plate carries a plurality of uniformly spaced oxyacetylene scarfing torches 137 which extend radially of the billet axis. In the present instance there are sixteen torches spaced 12° apart, and the plate and torches turn 6° when indexed, but obviously this exact relation is a matter of choice and subject to wide variation. Torches of any given size have an optimum linear spacing, and the angular relation between torches is chosen to furnish this optimum spacing when the torches are in their usual position of radial adjustment. After a billet has received one scarfing pass and the carriage returns to its starting position, the torches are indexed and the billet receives another scarfing pass. In this manner the surface of its upper half is fully covered.

Figure 11:
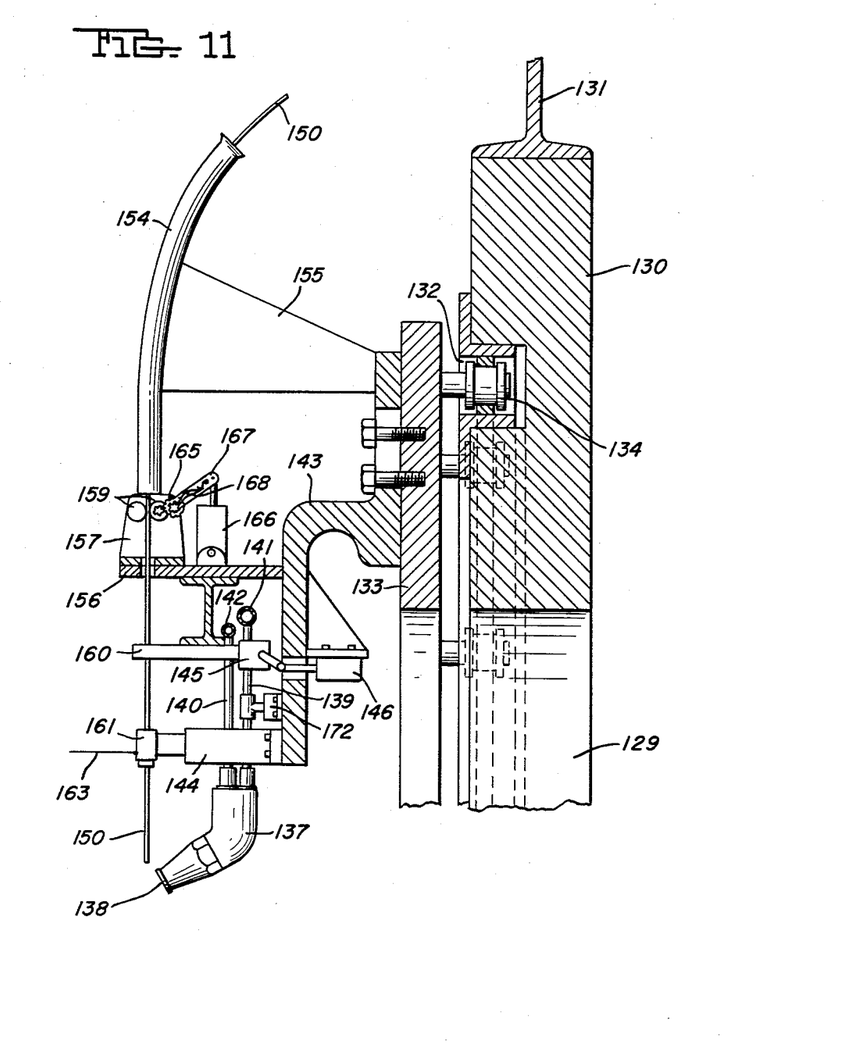
FIGURE 11 is a vertical section showing a portion of the structure shown in FIGURE 10 on a larger scale.

The torches 137 per se can be of a type conventionally used in scarfing. As best shown in the enlarged view of FIGURE 11, each torch inludes a nozzle 138 directed downwardly and toward thed irection the carriage 115 travels during a scarfing pass. An oxygen pipe 139 and an acetylene pipe 140 extend upwardly from the nozzle to respective yieldable semicircular manifolds 141 and 142, which are connected to sources of these gases under suitable operating pressures. The indexing plate 133 carries Z brackets 143 supported for adjustment radially of the billets to accommodate billets of different diameter, each torch having its individual bracket. Each bracket carries clamps 144 which are of insulating material and engage pipes 139 and 140 to mount the torch. Each oxygen pipe contains a secondary oxygen valve 145 which is operated by a solenoid 146 mounted on the back of the respective bracket 143.

A platform 147 is connected to the exit end of carriage 115 through links 148 and has flanged wheels 149 which ride on rails 114. Starting rods 150 for the torches are carried on supply reels 151 journaled to the top of platform 147, pass over sheaves 152 journaled to carriage 115 above the respective torches, and extend downwardly through guides 153 mounted on beam 131 and curved guide tubes 154. Each tube is supported on an individual bracket 155 which extends outwardly from the upper edge of the respective Z bracket 143. A shelf 156 projects from each Z bracket below bracket 155 and each shelf carries an upstanding lug 157. Below the tube 154, each starting rod passes between a pair of pinch rolls 159 journaled to the respective lug 157, through an opening in the shelf 156, through a guide 160 suspended below the shelf, and through a guide 161 projecting from clamp 144. The lower end of the rod normally lies just above its respective nozzle 138. The nozzle is electrically insulated from the starting rod, and electric leads 162 and 163 are connected to the nozzle and rod respectively, the latter through the guide 161. The pinch rolls 159 are for the purpose of feeding the starting rod. The inner pinch roll carries a pinion 164 which meshes with a pinion 165 journaled to the lug 157. A solenoid 166 is pivoted to the top of shelf 156 and its plunger is pivoted to a lever 167 whose other end is pivoted to the shaft of pinion 165. A pawl and ratchet 168 connects the lever and pinion. Whenever solenoid 166 is energized, its plunger moves downwardly and acts through lever 167 and the pawl and ratchet to rotate the inner pinch rolls 159 counter-clockwise as viewed in FIGURE 11, and thus feed the starting rod 150 a fixed distance. When the solenoid is de-energized, the pawl and ratchet 168 allow the plunger to return without moving the starting rod.

During a scarfing pass of carriage 115, pilot flames issue from the nozzle 138 of each torch 137 resulting from small quantities of oxygen and acetylene introduced via pipes 139 and 140. As long as there is no defect in the path of a torch, its solenoids 146 and 166 remain de-energized. The secondary oxygen valve 145 remains closed, the starting rod does not feed, and of course no scarfing is performed. When the nozzle of any torch reaches a defect that is to be burned away, mechanism hereinafter described energizes its solenoid 166 to feed the starting rod. As soon as the rod advances into the pilot flame, it completes a current path between the nozzle 138 and the starting rod 150, the flame having sufficient electrical conductivity for this purpose. Completion of this current path energizes solenoid 146 and opens the oxygen valve 145. When the valve opens, it actuates a pressure switch 172 which maintains the solenoid energized independently of the flame. In accordance with usual practice, the tip of the starting rod melts and deposits a drop of molten metal, which kindles a reaction between oxygen issuing from the nozzle and the billet surface. After the nozzle moves past the defect, the solenoid 146 is de-energized and the oxygen valve closes.

Preferably an additional pair of vertical members 173 depend from opposite sides of the carriage 115 intermediate the length thereof within frame 113. These vertical members provide support for a blower 174 which is directed toward the scarfing torches to cool them and blow away scale.

*Transcriber*

As already mentioned, the transcriber portion of the recorder-transcriber 12 controls operation of the scarfing torches 137 in accordance with the recording made by the recording portion. The recorder-transcriber includes a transcribing carriage 175 slidably supported on a pair of guide rods 176 which extend between the end plates 66 and 67 (FIGURES 5 and 7). A lead screw 177 is journaled in bearings on these end plates and threadedly engages a feed nut 178 on the carriage. A transverse shaft 179 is journaled in bearings 180 on frame 113 and a bearing 181 on the end plate 67. Shaft 179 is driven from the lead screw 117 through gearing 182 and drives the lead screw 177 through gearing 183. The gear ratio equals that between the drive for the detecting carriage 31 and the longitudinal drive for the recording heads 93 and 94, in the present example 4 to 1.

The transcriber carriage 175 includes a depending plate 184, from which extend four horizontal guide pins 185. A transcriber head 186 is supported on said guide pins, having arcuate slots 187 receiving the pins. The transcriber head carries a plurality of pickups 188 corresponding in number to the torches 137, each pickup being connected through suitable amplifiers to the solenoids 146 and 166 of a different torch. The pickups are arranged in an arc overlying a portion of the suface of the recording cylinder 70 of equivalent extent to the portion covered by the recording heads 93 and 94, but 180° removed. The transcriber head can be indexed to correspond with indexing of the scarfing torches, the angles of indexing being in the same ratio as the scale of circumferential reduction. Thus in this example the pickups cover an arc of 45° and they turn 3° when indexed. A double-acting fluid pressure cylinder 189, equipped with suitable control valves, not shown, is pivoted to carriage 175 and contains a piston and piston rod 190 pivoted to the transcriber head 186 to effect indexing movement thereof.

*Electric Circuits*

Figure 12:
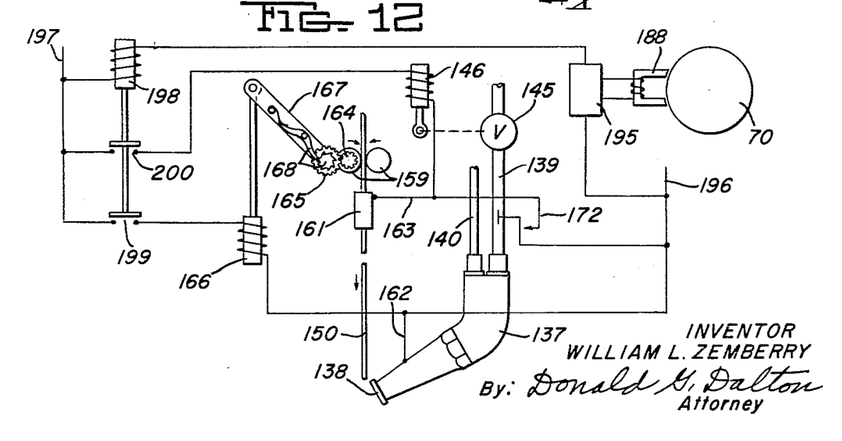
FIGURE 12 is a schematic wiring diagram.

As already mentioned, the circuits for driving and stopping the cars 14 and carriages 31 and 115, for oscillating the detectors 50 and 51, for transmitting signals from said detectors to the recording heads 93 and 94, for turning the recording cylinder 70, and for indexing the torches 137 and transcriber head 186, follow well known conventional principles. In the interest of simplicity and conciseness of illustration, no detailed showing is included. FIGURE 12 shows schematically a circuit for controlling operation of one torch 137 from its transcribing mechanism. The circuits for the other torches can of couse be similar, and hence are not shown in detail.

As shown in FIGURE 12, the pickup 188 is connected to a conventional amplifier 195 which is connected across lines 196 and 197 in series with the coil of a relay 198. These lines are connected to any suitable power source. When a magnetized spot on the recording cylinder 70 induces current flow in the pickup, the amplifier transmits sufficient current to energize the relay. Two sets of normally open contacts 199 and 200 in the relay close. Contacts 199 complete a current path through the rod feed solenoid 166. Thereupon this solenoid acts through lever 167, gear 165 and pinch rolls 159 to feed the starting rod 150 into the pilot flame issuing from nozzle 138 of torch 137, as already explained. This action completes a current path from line 196 through the electric lead 162 connected to the nozzle, through the pilot flame, through the starting rod, through guide 161, through the electric lead 163 connected to said guide, through the oxygen solenoid 146, and through contacts 200 to line 197. Thus the oxygen solenoid is energized and opens the secondary oxygen valve 145. High pressure oxygen flows through pipe 139 to scarf the billet and also acts to close the pressure switch 172. This switch is connected in parallel with the nozzle and starting rod and maintains solenoid 146 energized independently of the flame. When flow of current ceases in the pickup, relay 198 drops out and opens contacts 199 and 200, whereupon both solenoids 146 and 166 are de-energized. Valve 145 closes, switch 172 opens, scarfing ceases, and the rod feeding means resets.

From the foregoing description, it is seen that my invention affords a largely automatic apparatus for continuous and selective removal of surface defects from a billet or equivalent semifinished metallic body. Although I have shown the invention as applied to a billet of circular cross section, it is apparent similar principles can be followed for removing surface defects from billets of other cross section. It is also apparent that the apparatus is well adapted for further automation. For example, the various movements can be controlled by limit switches, as already pointed out; the depth of scarfing cuts can be controlled and deep cuts can be flared by varying oxygen pressure in accordance with the intensity of magnetism of the recording cylinder; and checking circuits and automatic stop means can be provided for preventing improper operation.

While I have shown and described only a single embodiment of my invention, it is apparent that modifications may arise. Therefore, I do not wish to be limited to the disclosure set forth but only by the scope of the appended claims.

I claim:

1. An apparatus for removing defective portions from a billet surface comprising detecting means adapted to traverse a billet surface and produce electric signals in response to defects therein, a magnetic recording surface, recording means operatively connected with said detecting means for magnetizing spots on said recording surface in response to signals from said detecting means, scarfing means adapted to traverse the billet surface for burning out the defects, and transcribing means operatively connected with said scarfing means and cooperable with said recording surface for controlling operation of the scarfing means in accordance with magnetized spots on said recording surface.

2. An apparatus for removing defective portions from a billet surface comprising movable support means for a billet, a detecting device and a scarfing device, said support means being adapted to position the billet successively in said detecting device and in said scarfing device, said detecting device including means for traversing the billet surface and producing electric signals in response to defects therein, said scarfing device including torches adapted to traverse the billet surface for burning out the defects, and a recorder-transcriber including a magnetic recording surface, means operatively connected with said detecting device for magnetizing spots on said recording surface in response to signals from the detecting device, and transcribing means operatively connected with said scarfing device and cooperable with said recording surface for turning said torches on and off in accordance with magnetized spots on the recording surface as the torches traverse the billet surface.

3. An apparatus for removing defective portions from a billet surface comprising detecting means adapted to traverse a billet surface and produce electric signals in response to defects therein, a rotatable magnetic recording cylinder, a recording head movable with said detecting means and adapted to traverse a portion of said cylinder and magnetize spots on its surface in response to signals from said detecting means, scarfing means adapted to traverse the billet surface for burning out the defects, and transcribing means operatively connected with said scarfing means and adapted to traverse the same portion of said cylinder after rotation thereof through a partial revolution for controlling operation of the scarfing means in accordance with magnetized spots on the cylinder surface.

4. An appartus for removing defective portions from a billet surface comprising movable support means for a billet, a detecting device and a scarfing device, said support means being adapted to position the billet successively in said detecting device and in said scarfing device, said detecting device including a detector for traversing the billet surface and producing electric signals in response to defects therein, said scarfing device including torches adapted to traverse the billet surface for burning out the defects, and a recorder-transcriber including a rotatable magnetic recording cylinder, a recording head movable with said detector and adapted to traverse a portion of said cylinder and magnetize spots therein in response to signals from said detector, and transcribing means movable with said torches and adapted to traverse the same portion of said cylinder after rotation thereof through a partial revolution for turning the torches on and off in accordance with magnetized spots on the cylinder surface.

5. An apparatus for removing defective portions from a billet surface comprising movable support means for a billet, a detecting device and a scarfing device, said support means being adapted to position a billet successively in said detecting device and in said scarfing device, said detecting device including a detector for producing electric signals in response to defects and means for moving said detector over the billet surface in a spiral path, said scarfing device including oxyacetylene torches adapted to traverse the billet surface for burning out the defects, and a recorder-transcriber including a rotatable magnetic recording cylinder, a recording head operatively connected with said detector and movable therewith in a spiral path on a reduced scale over a portion of said cylinder for magnetizing spots thereon in response to signals from said detector, and transcribing means movable on a reduced scale with said torches and operatively connected therewith and adapted to traverse the same portion of said cylinder after rotation thereof through a partial revolution for turning the torches on and off in accordance with magnetized spots on the cylinder surface.

References Cited in the file of this patent

UNITED STATES PATENTS

| 1,732,912 | Rooke | Oct. 22, 1929 |
| 2,186,096 | Bucknam | Jan. 9, 1940 |
| 2,309,096 | Bucknam et al. | Jan. 26, 1943 |
| 2,309,343 | Farrow | Jan. 26, 1943 |
| 2,436,503 | Cleveland | Feb. 24, 1948 |
| 2,438,098 | Tandler et al. | Mar. 16, 1948 |
| 2,570,405 | Tandler et al. | Oct. 9, 1951 |
| 2,672,392 | Caples et al. | Mar. 16, 1954 |
| 2,684,464 | Hastings et al. | July 20, 1954 |
| 2,755,160 | Holmes | July 17, 1956 |

FOREIGN PATENTS

| 1,114,501 | France | Apr. 13, 1956 |

OTHER REFERENCES

Metal Progress, May 1936 (pages 35–38).